J. S. LATTIMORE.
REMOVABLE HANDLE FOR SHOVELS.
APPLICATION FILED APR. 29, 1911.
1,012,661.
Patented Dec. 26, 1911.
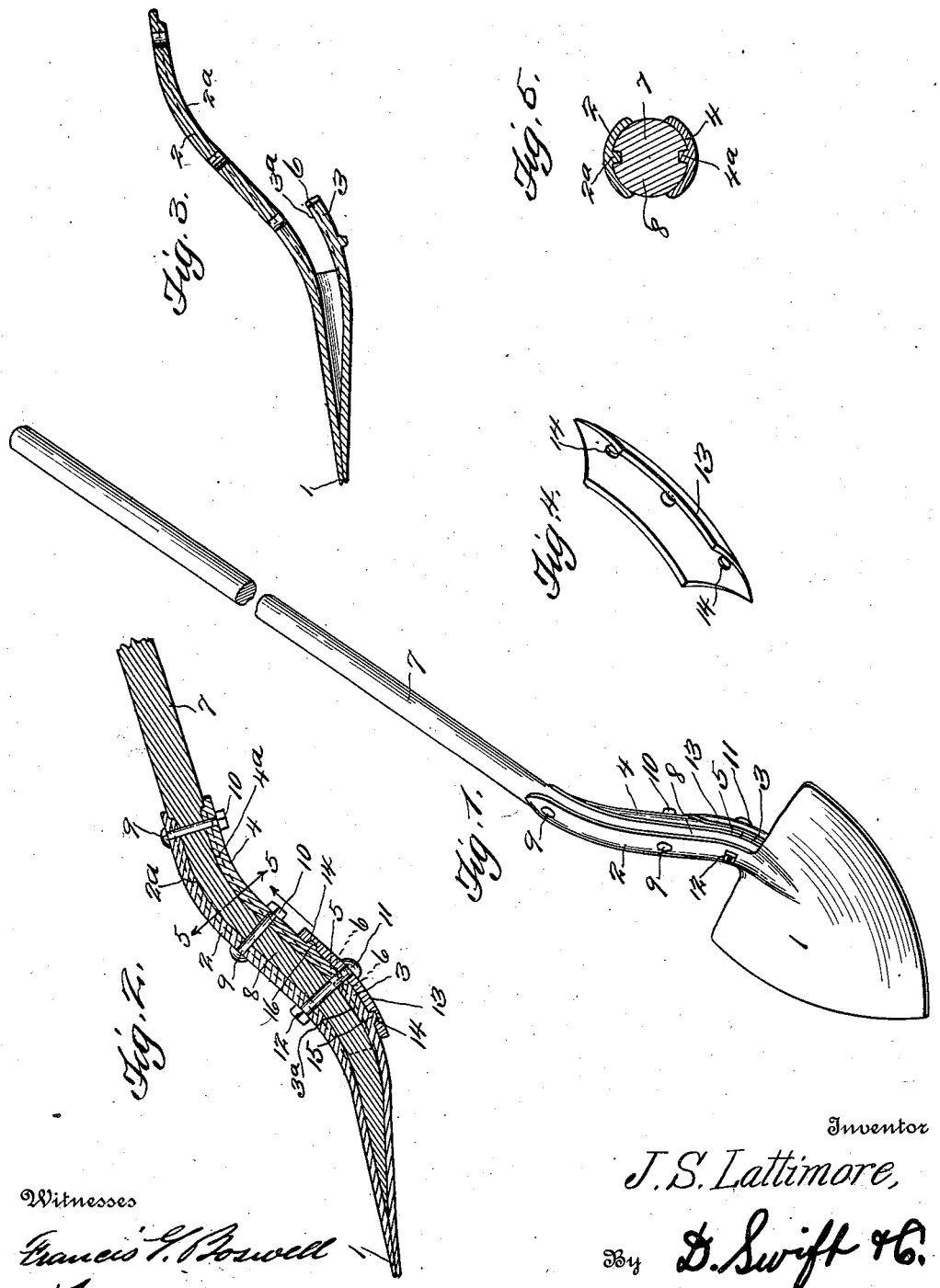
Witnesses
Francis G. Boswell
J. Dunn
Inventor
J. S. Lattimore,
By D. Swift &C.
Attorney

UNITED STATES PATENT OFFICE.

JAMES S. LATTIMORE, OF REDDING, CALIFORNIA.

REMOVABLE HANDLE FOR SHOVELS.

1,012,661.  Specification of Letters Patent.  Patented Dec. 26, 1911.

Application filed April 29, 1911. Serial No. 624,259.

*To all whom it may concern:*

Be it known that I, JAMES S. LATTIMORE, a citizen of the United States, residing at Redding, in the county of Shasta and State of California, have invented a new and useful Removable Handle for Shovels; and I do hereby declare the following to be a full, clear, and exact description of the invention, such as will enable others skilled in the art to which it appertains to make and use the same.

This invention relates to a new and useful removable handle for shovels, spades and the like.

The main object of the invention is to construct the handle receiving portion of a shovel, in such wise as to permit of a ready removal of an old handle, for the insertion of a new one.

This invention is especially adapted for use in connection with shovels of the design shown in the drawings. It will be observed that it would be rather difficult to remove the old handle of a shovel of the design shown in the drawings, if the handle receiving portion of the shovel was not constructed as hereinafter described and shown. In the drawings, however, there is only disclosed one form of the invention, but in practical fields this form may require alterations, to which the applicant is entitled provided the alterations are comprehended by the appended claims.

The invention comprises further features and combination of parts as hereinafter set forth, shown in the drawings and claimed.

In the drawings:—Figure 1 is a view in perspective of a shovel constructed in accordance with the invention. Fig. 2 is a longitudinal sectional view. Fig. 3 is a detail view of the shovel without the handle. Fig. 4 is a detail view of a plate for clamping a section of the handle receiving portion of the shovel to the shovel. Fig. 5 is the transverse sectional view on line 5—5 of Fig. 2.

Referring more particularly to the drawings, 1 designates a shovel, from which a compound curved extension 2 (which is substantially semi-circular in cross section) extends, thus providing one section of the handle receiving member. Also projecting from the shovel is a short extension 3, which is also substantially semi-circular in cross section. A plate 4 curved substantially semi-circular in cross section and correspondingly curved relatively to the extension 2 is also provided. This plate 4 is arranged with its end 5 in contact with the extension 3, and where the plate 4 and the extension 3 meet, semi-circular recesses 6 are formed in the end of the plate 4 and the extension 3. The lower end of the handle 7 terminates in a compound curved portion 8, which is disposed between the plate 4 and the extension 2, when assembling the handle to the shovel. Bolts 9 provided with nuts 10 penetrate the plate 4, the compound curved portion of the handle and the extension 2, so as to hold the handle in position. To hold the plate 4 properly in position and adjacent the extension 3 a clamping plate 13 is provided, which corresponds in shape to the extension 3 and the plate 4. This clamping plate 13 fits over the extension 3 and the plate 4, and is provided with recesses 14 to receive the members 15 and 16 of the plate 4 and the extension 3, in order to prevent movement of the clamping plate. The bolt 11 passes through the clamping plate 13 through the registered recesses 6, and through the compound curved portion of the handle and the extension 2, and is subsequently secured in position by the nut 12.

It will be observed from the foregoing in connection with the annexed drawings, that old or new shovels may be disassembled in accordance with the showing in the drawing, so that the old handle may be removed for the insertion of a new one.

The invention having been set forth, what is claimed as new and useful is:

1. In combination, a shovel having an elongated compound curved extension semi-circular in cross section and also provided with a short extension, a plate corresponding in shape to the elongated extension, between which and the curved extension a compound curved portion of a handle is arranged, means penetrating the handle and the plate and the curved extension for connecting them in position, the plate being arranged adjacent the short extension, and means for holding the plate adjacent and connected to the short extension.

2. In combination, a shovel, a handle therefor having a compound curved portion, the shovel having an elongated compound curved extension semi-circular in cross section to fit the compound curved portion of the handle, and also having a short extension below the first extension, a plate corresponding in shape to the elongated extension and fitted on the underside of the compound curved portion of the handle, the plate having one of its ends arranged adjacent the short extension, a clamping plate having means for connecting the short extension and the first plate, the adjacent ends of the short extension and the first plate having recesses, a bolt extending through the clamping plate, the recesses, the compound curved portion of the handle and the first extension and provided with a nut, and means penetrating the first plate and first extension and the handle for holding the said parts in position.

In testimony whereof I have signed my name to this specification in the presence of two subscribing witnesses.

JAMES S. LATTIMORE.

Witnesses:
 FERD. HURST,
 ARCH M. MCAFEE.

Copies of this patent may be obtained for five cents each, by addressing the "Commissioner of Patents, Washington, D. C."